Oct. 4, 1932.  J. T. GRAHAM  1,881,402
CASTER
Filed Feb. 19, 1932

INVENTOR
John T. Graham
By Jack Snyder
Attorney

Patented Oct. 4, 1932

1,881,402

UNITED STATES PATENT OFFICE

JOHN T. GRAHAM, OF CREIGHTON, PENNSYLVANIA, ASSIGNOR OF ONE-HALF TO JOHN F. KOWK, OF CREIGHTON, PENNSYLVANIA

CASTER

Application filed February 19, 1932. Serial No. 593,992.

My invention relates to casters, and while primarily intended for use as supports for furniture and the like, it will be obvious that the device may be employed for any purposes wherein it is found to be applicable.

Important objects of this invention are to provide a device of the character described, in a manner hereinafter referred to, which embodies a supporting ball mounted in ball bearings allowing universal rotary movement of the former, which is simple in its construction and arrangement, smooth running and noiseless, strong, durable and efficient in its use, and comparatively inexpensive to manufacture.

With the foregoing and other objects in view which will appear as the description proceeds, the invention resides in the novel construction, combination and arrangement of parts hereinafter described and illustrated in the accompanying drawing, wherein like numerals of reference designate corresponding parts throughout the several views and wherein.

Figure 1:
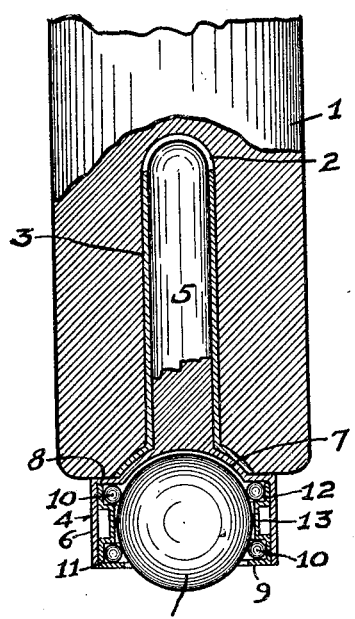
Figure 1 is a side elevational view, partly in cross section, of a caster constructed in accordance with my invention, and illustrating its application and connection as a support.
Figure 3:
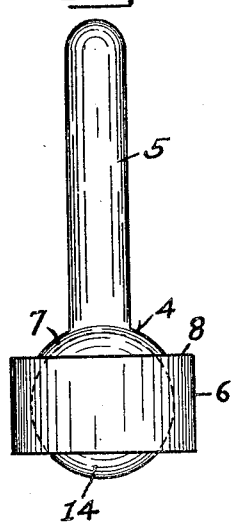
Figure 3 is a side elevational view of my improved device.
Figure 4:
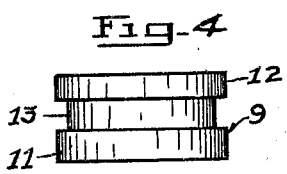
Figure 4 is a side elevational view of the duplex race for the ball bearings.
Figure 2:
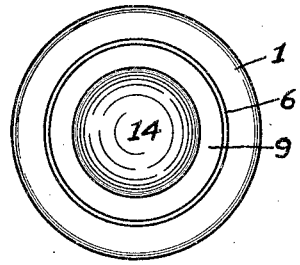
Figure 2 is a bottom plan view thereof.

Referring in detail to the drawing 1 denotes a rounded leg member of some piece of furniture provided at its lower end with a vertically disposed socket 2 having a flared lower end. A tubular liner 3, having a similarly flared lower end is fixed in the socket 2 to prevent wear to the latter from the operation of the caster element.

The caster comprises a body portion 4 consisting of a vertically disposed stem 5 adapted for insertion in the tubular liner 3 for connecting the body portion 4 to the leg member 1. The lower end of the stem 5 is integrally formed with, welded or otherwise secured to a cylindrical, hollow casing 6 having an open lower end, and a curvilinear top 7, the outer marginal edge, of which is flat, as indicated at 8.

A duplex race member 9, for housing bearing balls 10, is fixedly mounted in the casing 6 by being forced therein under pressure or in any other suitable manner. The race member 9 has its lower end formed to provide a circumferentially extending groove 11, and its upper end to provide the circumferentially extending seat 12, which latter is substantially L-shaped in transverse cross section. The groove 11 and seat 12 are provided by the formation of the intermediate reduced connecting portion 13.

When the race member 9 is fixed in position in the casing 6, as clearly shown in Figure 1 of the drawing, the flat top portion 8, of the casing 6, forms a complemental top wall for the seat 12, providing, in combination with the latter, a complete groove disposed parallel to and spaced from the groove 11.

The groove 11 and the seat 12 are each filled with a circumferentially aligned row of bearing balls 10 before the race member 9 is secured in position in the casing 6.

A comparatively large supporting ball 14 is mounted in the race member 9, and is engaged only by the two rows of bearing balls 10, mounted respectively in the groove 11 and in the seat 12. The row of bearing balls 10 mounted in the seat 12 are disposed above the diametric center of the supporting ball 14, and the row of bearing balls 10 mounted in the groove 11 are disposed below the diametric center of the supporting ball 14.

By this arrangement the latter will be maintained in position in the race member 9 and at the same time allow a free universal rotary movement of the supporting ball 14.

In assembling my improved device, the bearing balls 10 are first placed in the groove 11 of the race member 9, the supporting ball 14 then being positioned in the race member 9 through the open top thereof. Bearing balls 10 are now placed in the seat 12 after which the race member 9 is forced in position in the casing 6 in any suitable manner.

While illustrating and describing a stem and socket connection for attaching my improved device for use, it will be obvious that any other suitable attaching elements therefor may be employed to best meet conditions found in practice.

The present invention provides a most efficient device of its kind, which may be conveniently employed for replacing casters of the usual construction now in common use, and which will greatly facilitate the movement of heavy objects equipped therewith.

What I claim is:

1. A caster for the purpose set forth comprising a body portion including a hollow cylindrical casing, said casing having a curvilinear top provided with a flat outer marginal edge, a duplex race member mounted in said casing and formed with a circumferentially extending groove at its lower end and with a circumferentially extending seat at its upper end, said seat being substantially L-shaped in transverse cross section and forming a groove when combined with said flat marginal edge of said casing top, bearing balls carried in said seat and in said groove, a supporting ball positioned in said race member and being engaged by said bearing balls, said body portion including an attaching element.

2. A caster for the purpose set forth comprising a body portion provided with an attaching element and including a hollow cylindrical casing, said casing having a curvilinear top provided with a flat outer marginal edge, a duplex race member fixed in said casing and formed with a circumferentially extending groove on its lower end and with a circumferentially extending seat on its upper end, said seat being substantially L-shaped in transverse cross section and forming a groove when combined with said flat marginal edge of said casing top, bearing balls carried in said seat and in said groove, a supporting ball positioned in said race member, the bearing balls carried in said seat engaging the said supporting ball above its diametric center and the bearing balls carried in said groove engaging the said supporting ball below its diametric center.

In testimony whereof I affix my signature.

JOHN T. GRAHAM.